(12) United States Patent
Osborne et al.

(10) Patent No.: US 10,400,569 B2
(45) Date of Patent: Sep. 3, 2019

(54) GAS SEPARATOR

(71) Applicant: PRODUCTION TOOL SOLUTION, INC., Acton, CA (US)

(72) Inventors: Lawrence Osborne, Acton, CA (US); Joshua Terry Prather, Acton, CA (US)

(*) Notice: Subject to any disclaimer, the term of this patent is extended or adjusted under 35 U.S.C. 154(b) by 253 days.

(21) Appl. No.: 15/273,557

(22) Filed: Sep. 22, 2016

(65) Prior Publication Data

US 2017/0081952 A1 Mar. 23, 2017

Related U.S. Application Data

(60) Provisional application No. 62/222,025, filed on Sep. 22, 2015.

(51) Int. Cl.
*E21B 43/38* (2006.01)
*B01D 19/00* (2006.01)

(52) U.S. Cl.
CPC .......... *E21B 43/38* (2013.01); *B01D 19/0042* (2013.01)

(58) Field of Classification Search
CPC ....................................................... E21B 43/38
See application file for complete search history.

(56) References Cited

U.S. PATENT DOCUMENTS

| | | | |
|---|---|---|---|
| 2,883,940 A * | 4/1959 | Gibson | E21B 43/38 166/105.5 |
| 6,382,317 B1 | 5/2002 | Cobb | |
| 6,691,782 B2 * | 2/2004 | Vandevier | E21B 43/121 166/105 |
| 8,545,190 B2 | 10/2013 | Osborne | |
| 8,955,601 B2 | 2/2015 | Osborne | |
| 9,027,654 B2 | 5/2015 | Osborne | |
| 9,356,484 B2 | 5/2016 | Osborne | |
| 9,765,608 B2 * | 9/2017 | Sims | E21B 43/121 |
| 2003/0141057 A1 * | 7/2003 | Homstvedt | B01D 17/0208 166/265 |
| 2007/0119588 A1 * | 5/2007 | Gonzalez | E21B 43/38 166/105.5 |
| 2009/0065202 A1 | 3/2009 | Brown et al. | |
| 2009/0211763 A1 | 8/2009 | Fowler et al. | |
| 2012/0199210 A1 | 8/2012 | Osborne | |
| 2013/0068455 A1 * | 3/2013 | Brown | E21B 43/121 166/265 |
| 2013/0146798 A1 | 6/2013 | Osborne | |
| 2015/0075772 A1 * | 3/2015 | Saponja | E21B 43/121 166/115 |
| 2015/0184487 A1 | 7/2015 | Osborne | |
| 2015/0192141 A1 | 7/2015 | Nowitzki et al. | |
| 2015/0233207 A1 | 8/2015 | Osborne | |
| 2016/0222773 A1 * | 8/2016 | Sims | E21B 43/121 |

FOREIGN PATENT DOCUMENTS

WO WO 2004037376 A1 5/2004

* cited by examiner

*Primary Examiner* — Kipp C Wallace

(74) *Attorney, Agent, or Firm* — Paul D. Chancellor; Ocean Law

(57) ABSTRACT

A gas separator for use in a downhole production system includes a duct structure and a pump intake shroud.

5 Claims, 8 Drawing Sheets

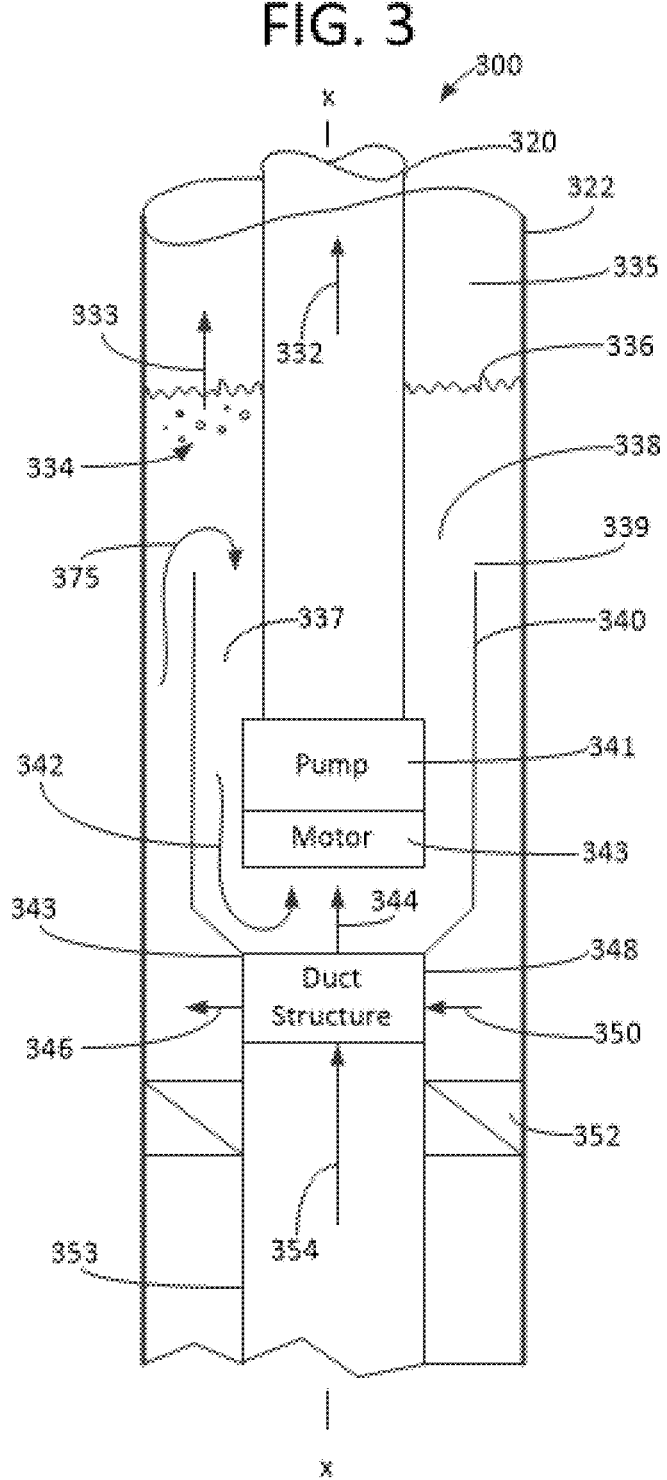

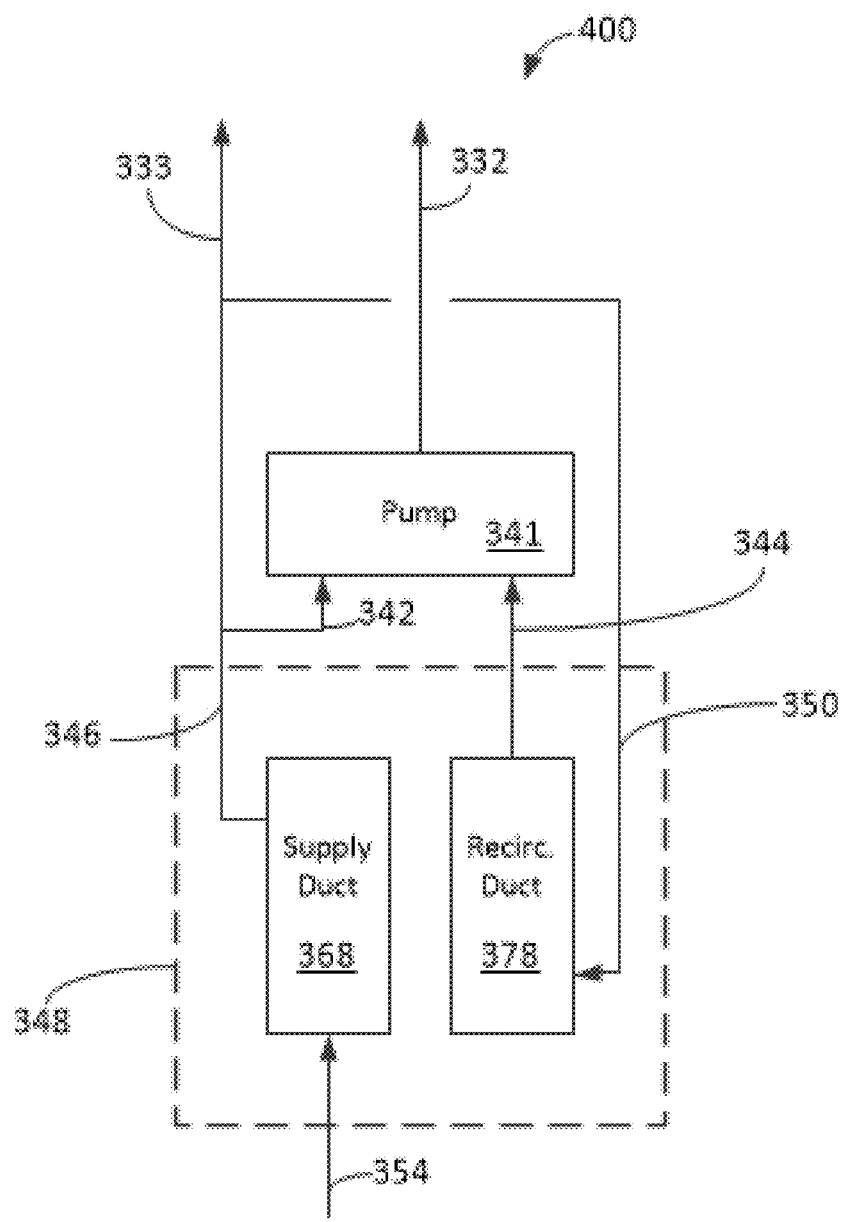

US 10,400,569 B2

GAS SEPARATOR

PRIORITY AND INCORPORATION BY REFERENCE

This application claims the benefit of U.S. Provisional Patent Application No. 62/222,025 filed Sep. 22, 2015 entitled GAS SEPARATOR.

This application incorporates by reference, in their entireties and for all purposes U.S. Pat. No. 8,545,190 filed Apr. 23, 2010; U.S. Pat. No. 8,955,601 filed Apr. 19, 2011; U.S. Pat. No. 9,027,654 filed Oct. 23, 2013; and, U.S. Pat. No. 9,356,484 filed May 1, 2014.

This application incorporates by reference, in their entireties and for all purposes U.S. Pat. App. Pub. Nos.: 2012-0199210 filed Apr. 13, 2012; 2013-0146798 filed Jan. 21, 2013; 2015-0184487 filed Feb. 27, 2015; 2015-0233207 filed May 1, 2015; and, 2009-0065202 filed Sep. 10, 2007.

BACKGROUND OF THE INVENTION

Field of the Invention

The present invention relates to a system and method for removing gas from a fluid flow. In particular, a duct structure supplies a fluid to a pump intake shroud.

Discussion of the Related Art

Where a fluid will be pumped, separating gas from the fluid beforehand may be beneficial. Known fluid/gas separators can perform this task in a variety of environments.

Among the most demanding environments for fluid/gas separators is the submersed pump environment as in a well for producing a gas laden fluid such as a hydrocarbon fluid. Challenges here include severe space constraints and required high reliability while performing under varying and often unpredictable operating conditions.

Having developed several acceptable downhole oil/gas separator designs, new oil/gas separator solutions appear to be of little interest to the industry. Rather, with proven solutions in hand the industry typically avoids the risks of developing new technologies as reputational and financial costs of failed oilfield experiments likely exceed the perceived value of the new technology.

An exemplary downhole oil/gas separator solution is found in U.S. Pat. Pub. No. 2009/0065202 filed Sep. 10, 2007. Here, a well fluid pumping apparatus comprises a rotary pump, a gas separator mounted to the pump, a shroud surrounding the gas separator, and a passage extending from a gas separator outlet through the shroud for discharging lighter components to a shroud exterior.

SUMMARY OF THE INVENTION

The present invention incorporates a duct structure that supplies a fluid to a pump intake shroud.

In an embodiment, A gas separator for use in a downhole production system, the gas separator comprises: a biduct for installation in a cased downhole production string including a pump; the pump for installation between production tubing and the biduct; the biduct for installation between the pump and reservoir tubing; a pump inlet shroud forming an annular sump for the pump; a supply duct of the biduct for receiving flow from the reservoir tube and for discharging reservoir flow to an annulus bounded by the casing; and, a recirculation duct of the biduct for receiving flow from the annulus bounded by the casing; wherein the pump sump is charged when (i) flow from the supply duct pools over the sump and (ii) flow from the recirculation duct empties into the sump.

BRIEF DESCRIPTION OF THE DRAWINGS

The present invention is described with reference to the accompanying figures. These figures, incorporated herein and forming part of the specification, illustrate the invention and, together with the description, further serve to explain its principles enabling a person skilled in the relevant art to make and use the invention.

FIG. 3 shows an embodiment of the gas separator of FIG. 1

FIG. 4 shows a flow diagram of the gas separator of FIG. 3.

DETAILED DESCRIPTION OF THE PREFERRED EMBODIMENTS

The disclosure provided in the following pages describes examples of some embodiments of the invention. The designs, figures, and description are non-limiting examples of certain embodiments of the invention. For example, other embodiments of the disclosed device may or may not include the features described herein. Moreover, disclosed advantages and benefits may apply to only certain embodiments of the invention and should not be used to limit the disclosed invention.

To the extent parts, components and functions of the described invention exchange fluids, the associated interconnections and couplings may be direct or indirect unless explicitly described as being limited to one or the other. Notably, indirectly connected parts, components and functions may have interposed devices and/or functions known to persons of ordinary skill in the art.

Figure 1:
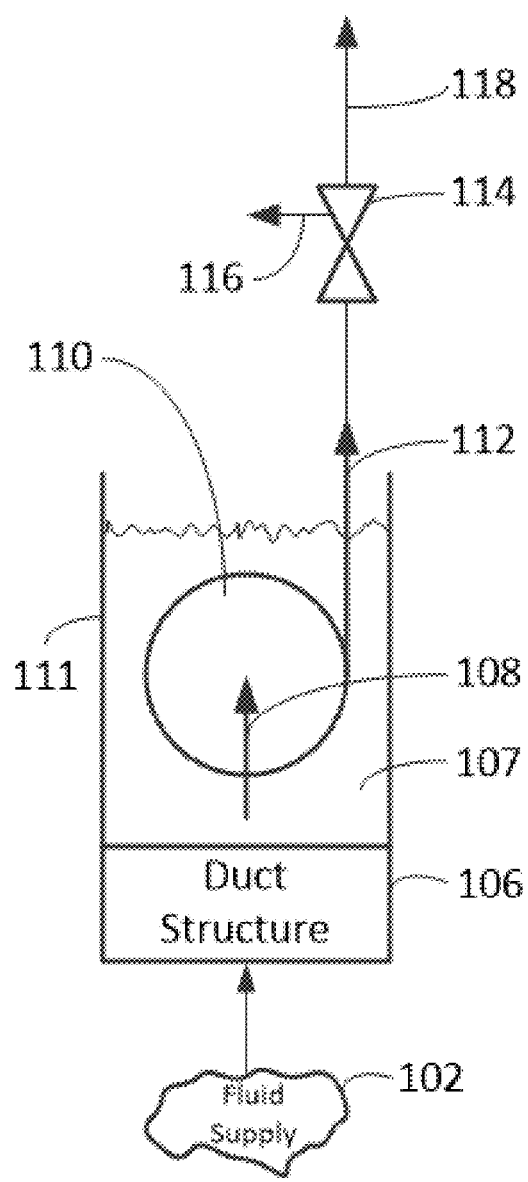
FIG. 1 shows a schematic diagram of the gas separator of the present invention incorporated in a portion of a fluid production string.

FIG. 1 shows a schematic of the present invention incorporated in a portion of a fluid production string 100. A pump 110 with a pump intake 108 and a pump intake shroud 111 takes suction from a fluid sump 107. The fluid sump is filled via a duct structure 106 that receives fluid from a fluid supply 102 such as a hydrocarbon well. Fluid leaves the pump via a pump discharge 112. In some embodiments, a valve such as a bypass valve 114 with a spill port 116 is fluidly coupled between the pump discharge and a production tubing string 118. In various embodiments, the inlets, outlets and ports are one or more of a fitting, flange, pipe, or similar fluid conveyance. The bypass valve 114 may be any suitable bypass valve such as one of the valves of U.S. Pat. Nos. 8,545,190, 8,955,601, 9,027,654 or one of the valves of U.S. Pat. Pub. Nos. 2012-0199210, 2013-0146798, 2015-0184487, 2015-0233207.

Figure 2:
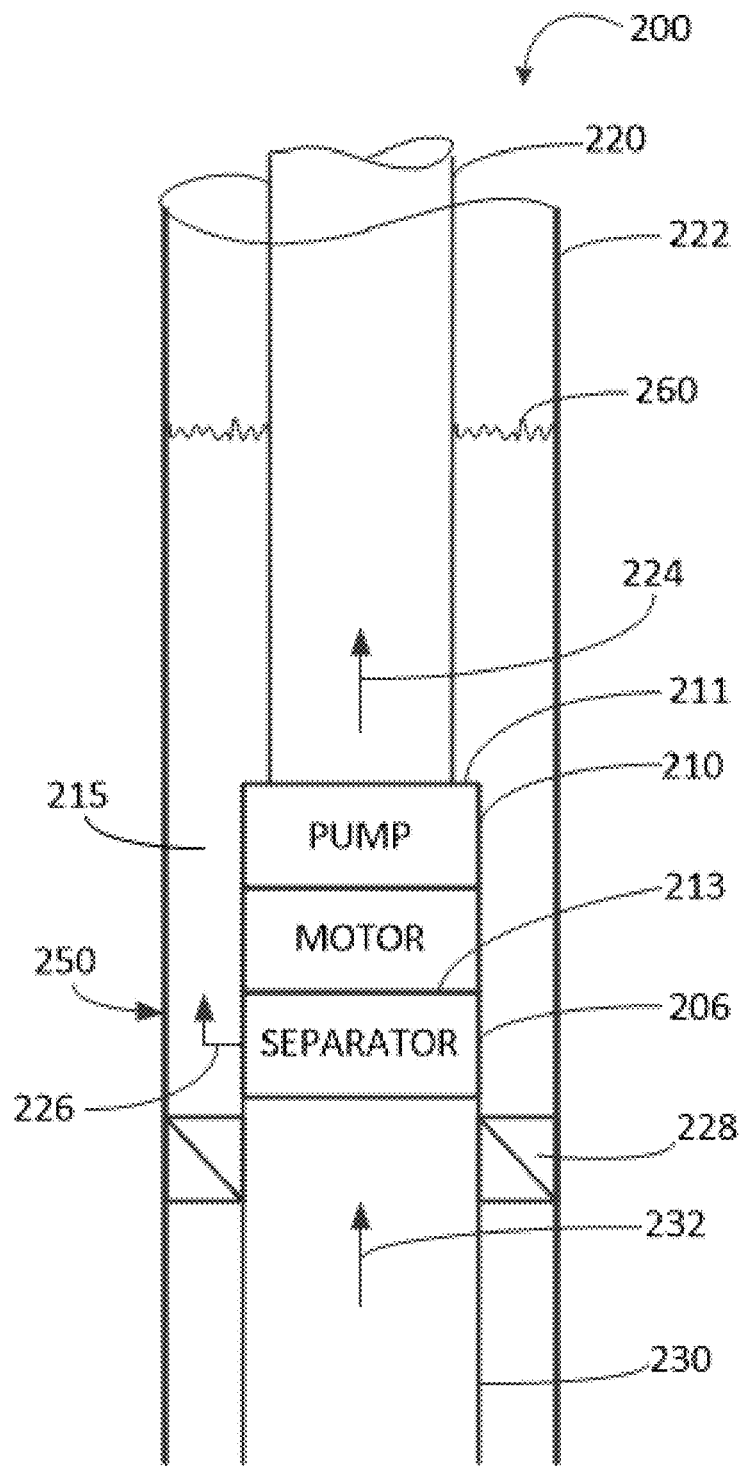
FIG. 2 shows an embodiment of the gas separator of FIG. 1.

FIG. 2 shows a gas separator of the present invention installed in a downhole location 200. A casing 222 encircles production tubing 220 that is fluidly coupled with a pump 210 and more particularly with a pump outlet 211. A gas separator including a duct structure 206 fluidly couples a pump intake 213 with a reservoir tube 230.

The pump is for receiving fluid from a fluid supply such as a hydrocarbon reservoir 102. As shown, the pump receives fluid 232 from the reservoir tube 230 via the gas separator 206 and moves the fluid 224 through the production tubing 220 for recovery, for example at a surface located well head.

In various embodiments, an annular passageway(s) 215 is formed between the casing 220 and one or more of the production tubing 220, pump 210, gas separator 206, and reservoir tubing 230. Gas that is separated from the fluid received 232 from the reservoir 102 may be discharged 226 as gas bubbles 250 from the gas separator 206 into a fluid pool 260 in the annular passageway 215. An annular packer or sealing ring 228 seals the annulus 215 below the gas discharge 226 to enable recovery of the separated gas, for example at a surface located well head.

FIGS. 3-4 show a gas separator of the present invention. In FIG. 3 the gas separator is shown installed in a downhole location 300. The gas separator is installed in a production string including a pump and production tubing arranged substantially about a longitudinal x-x axis. In FIG. 4 schematic flow paths are shown 400.

Similar to FIG. 2, a casing 322 encircles production tubing 320 that is fluidly coupled with a pump such as an electric submersible pump having an upper pump section 341 and a lower motor section 343. A gas separator includes a pump inlet shroud 340 and a duct structure 348 that fluidly couples the pump and a reservoir tube 353.

The pump is for receiving fluid from a fluid supply such as a hydrocarbon reservoir 102. As shown, the pump receives fluid 354 from the reservoir tube 353 and moves the fluid 332 through the production tubing 320 for recovery, for example at a surface located well head.

In various embodiments, an annular passageway(s) 335 is formed between the casing 322 and one or more of (i) the production tubing 320, (ii) pump inlet shroud 340, duct structure 348, and (iii) reservoir tubing 353. An annular packer or sealing ring 352 seals the annulus 335 near the duct structure 348 to enable recovery of the separated gas 333, for example at a surface located well head.

As seen, the pump inlet shroud 340 is a figure of revolution, for example a can, about the pump 341. A lower end of the shroud 343 interconnects with the duct structure 348 and an upper end of the shroud 339 is spaced apart from the production tubing 320 such that a shroud annulus 337 and an annular shroud inlet 338 are formed. In various embodiments, the shroud annulus provides a sump for the pump 341.

During normal operation, a fluid level 336 in the annulus 335 pools over the pump and motor 341, 343 such that pump operation transfers fluid from the annulus to the production tubing 320. Fluid from the annulus 335 reaches the pump 341 by (i) entering 375 through the pump shroud annulus 338 from the casing annulus 335 and (ii) passing through 350, 344 the duct structure 348.

FIG. 4 shows an embodiment of selected fluid paths of the gas separator of FIG. 3 where the duct structure 348 includes a supply duct 368 and a recirculation duct 378.

The supply duct 368 receives fluid 354 from the reservoir tubing 353. Fluid leaving 346 the supply duct pools over the pump 341 and motor 343 as it fills the casing annulus 335 and the shroud annulus 338 to a fluid level 336 above the shroud upper end 339. Pump operation moves fluid 342 from the shroud annulus to the production tubing 332. Gas bubbles 334 that reach the pooled fluid surface 336 collapse to produce a gas flow 333 in the casing annulus.

The recirculation duct 378 receives fluid 350 from the pooled fluid in the casing annulus 335. Fluid leaving the recirculation duct 344 enters the shroud 340 near the motor 343. Pump operation moves the fluid 344 from the shroud annulus 337 to the production tubing 332. In various embodiments, the fluid flow 344 is directed to cool the motor 343. In some embodiments, the fluid flow 344 impinges on the motor.

Gas that is separated from the fluid supplied 354 from the reservoir tube 353 is discharged 346 from the duct structure 348 into the casing annulus 335.

FIGS. 5A-D show schematic diagrams of embodiments of alternative duct structures 500A-D.

Figure 5A:
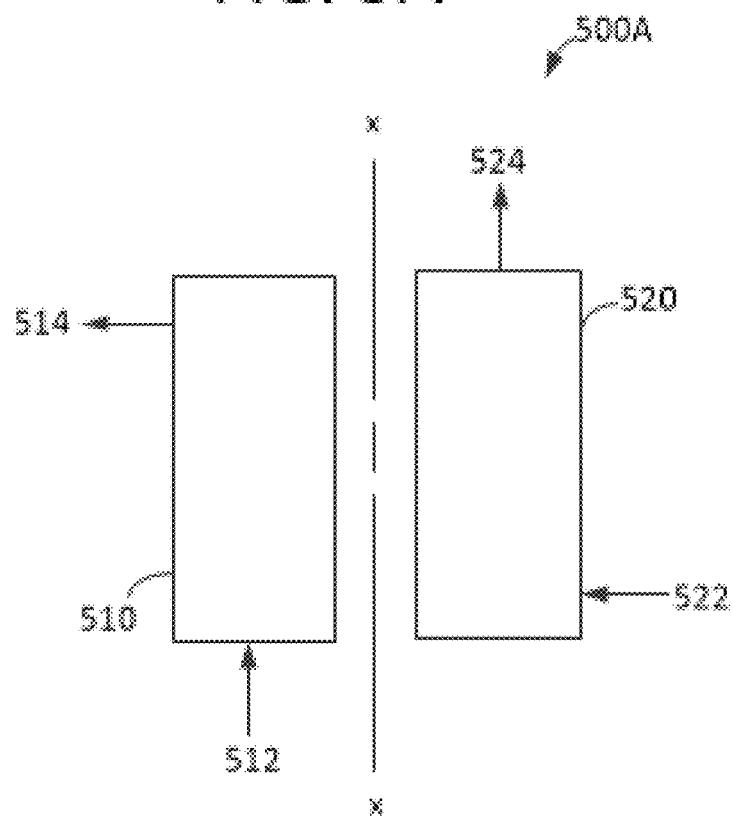
FIGS. 5A-B show duct structures with rectangular cross-sections for use with the gas separator of FIG. 3.

FIG. 5A shows a duct structure or duct structure portion 500A including supply 510 and recirculation 520 ducts having a somewhat rectangular cross-section. Fluid 512 from a fluid reservoir 102 enters the supply duct 510 in a direction about parallel to the longitudinal x-x axis and exhausts 514 into the casing annulus 335 in a direction about perpendicular to the longitudinal x-x axis.

Fluid 522 from the casing annulus 335 enters the recirculation duct 520 in a direction about perpendicular to the longitudinal x-x axis and exhausts 524 into the shroud annulus 337 in a direction about parallel to the longitudinal x-x axis.

Figure 5B:
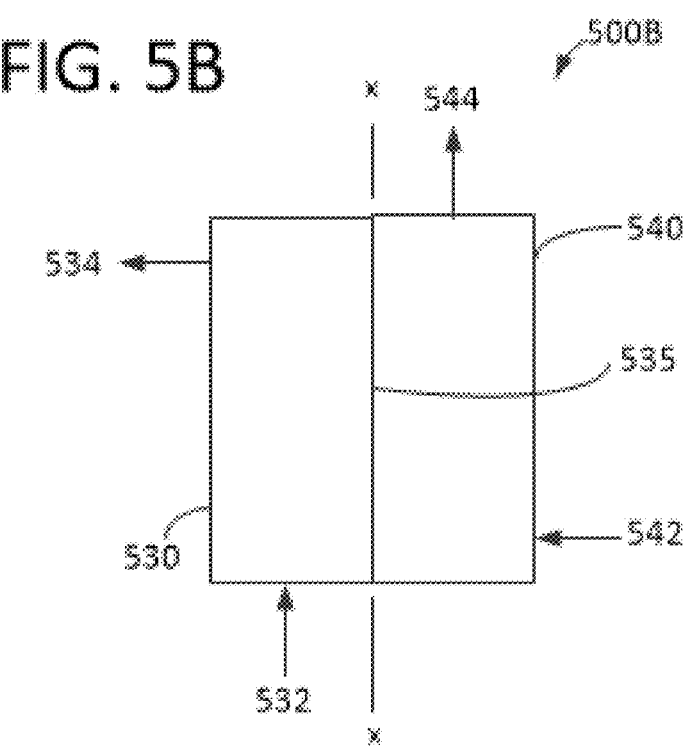

FIG. 5B shows a duct structure or duct structure portion 500B including supply 530 and recirculation 540 ducts having a somewhat rectangular cross-section. Notably, the ducts share a common central or dividing wall 535. Fluid 532 from a fluid reservoir 102 enters the supply duct 530 in a direction about parallel to the longitudinal x-x axis and exhausts 534 into the casing annulus 335 in a direction about perpendicular to the longitudinal x-x axis.

Fluid 542 from the casing annulus 335 enters the recirculation duct 540 in a direction about perpendicular to the longitudinal x-x axis and exhausts 544 into the shroud annulus 337 in a direction about parallel to the longitudinal x-x axis.

The duct structure of FIG. 5B may be referred to as a "biduct" with a common dividing wall while the duct structure of FIG. 5A may be referred to as a biduct without a common dividing wall.

Figure 5C:
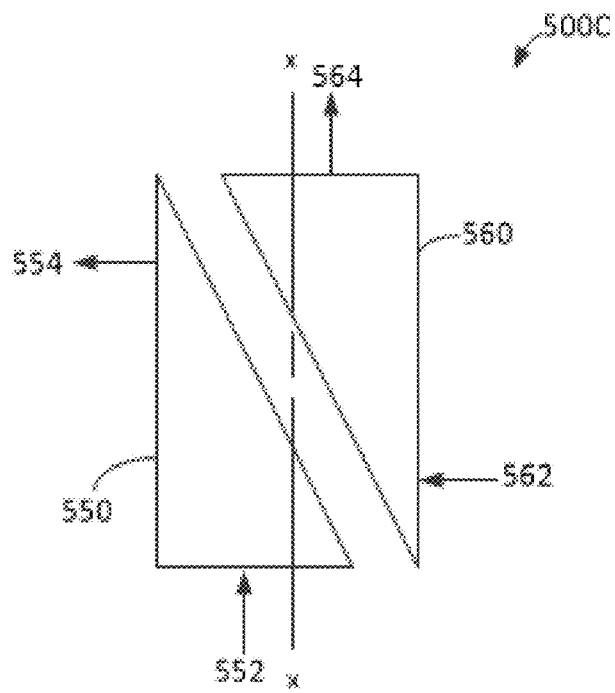
FIGS. 5C-D show duct structures with triangular cross-sections for use with the gas separator of FIG. 3.

FIG. 5C shows a duct structure or duct structure portion 500C including supply 550 and recirculation 560 ducts having a somewhat triangular cross-section. Fluid 552 from a fluid reservoir 102 enters the supply duct 550 in a direction about parallel to the longitudinal x-x axis and exhausts 554 into the casing annulus 335 in a direction about perpendicular to the longitudinal x-x axis.

Fluid 562 from the casing annulus 335 enters the recirculation duct 560 in a direction about perpendicular to the longitudinal x-x axis and exhausts 564 into the shroud annulus 337 in a direction about parallel to the longitudinal x-x axis.

Figure 5D:
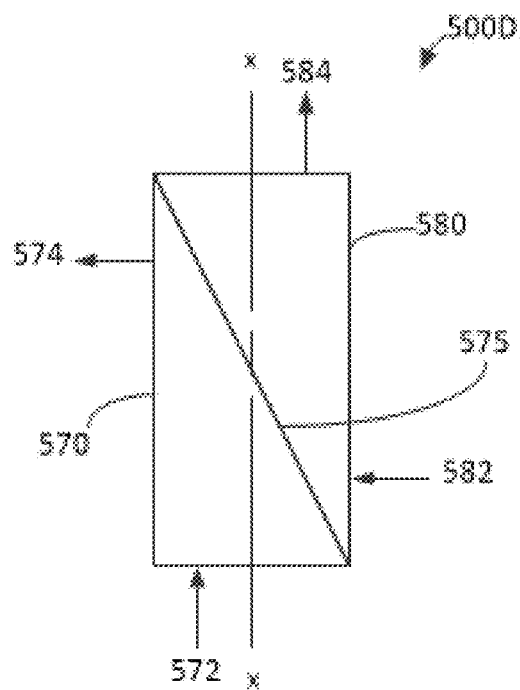

FIG. 5D shows a duct structure or duct structure portion 500D including supply 570 and recirculation 580 ducts having a somewhat triangular cross-section. Notably, the ducts share a common central or dividing wall 575. Fluid 572 from a fluid reservoir 102 enters the supply duct 570 in a direction about parallel to the longitudinal x-x axis and exhausts 574 into the casing annulus 335 in a direction about perpendicular to the longitudinal x-x axis.

Fluid 582 from the casing annulus 335 enters the recirculation duct 580 in a direction about perpendicular to the longitudinal x-x axis and exhausts 584 into the shroud annulus 337 in a direction about parallel to the longitudinal x-x axis.

The duct structure of FIG. 5D may be referred to as a biduct with a common dividing wall while the duct structure of FIG. 5C may be referred to as a biduct without a common dividing wall.

Figure 6:
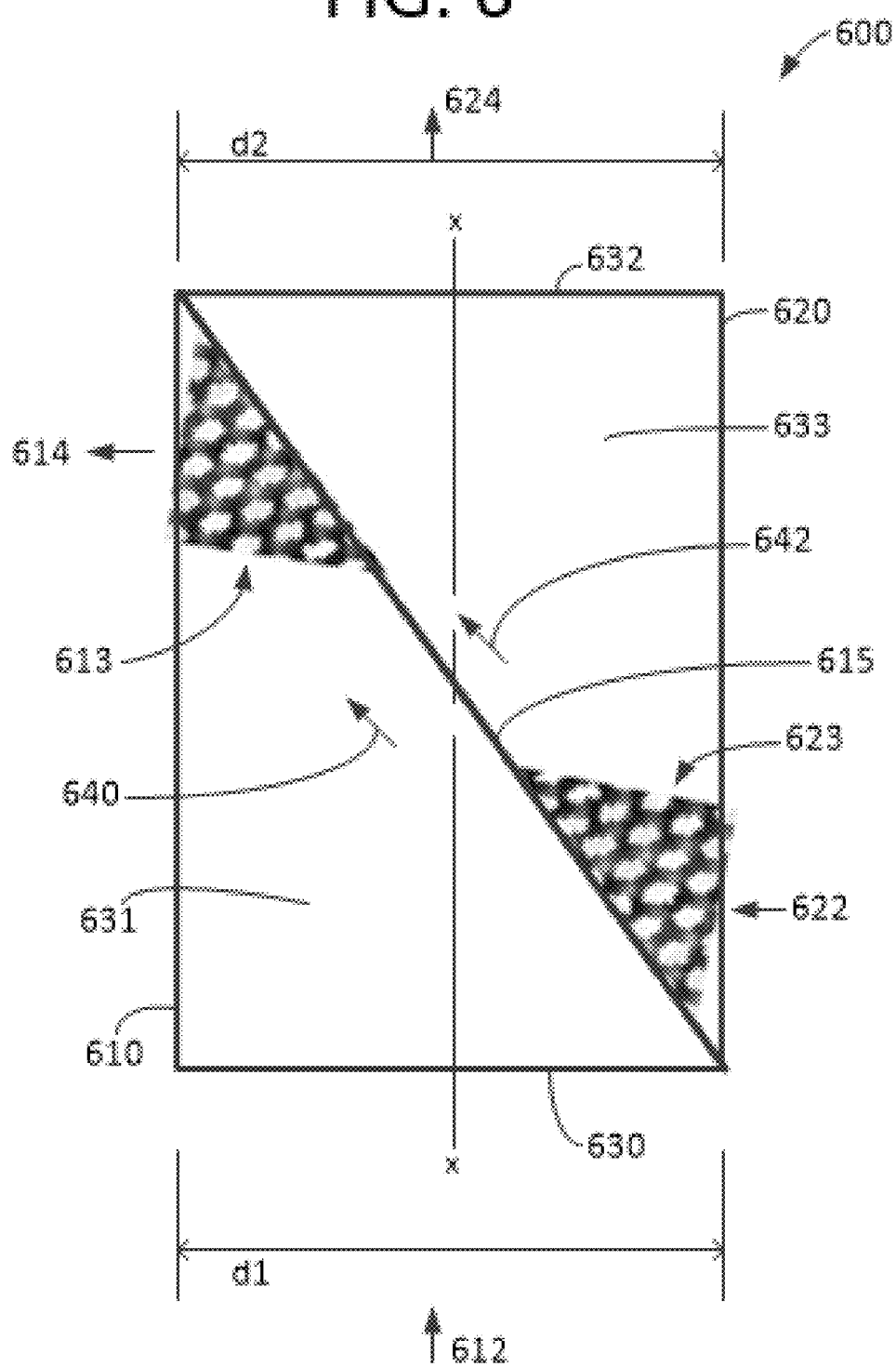
FIG. 6 shows a duct structure with a triangular cross-section for use with the gas separator of FIG. 3.

FIG. 6 shows a duct structure 600 including supply 610 and recirculation 620 ducts having a somewhat triangular or wedge shaped cross-section. Notably, the ducts share a common central or dividing wall 615. Fluid 612 from a fluid reservoir 102 enters the supply duct 610 in a direction about parallel to the longitudinal x-x axis and exhausts 614 into the casing annulus 335 in a direction about perpendicular to the longitudinal x-x axis.

Fluid 622 from the casing annulus 335 enters the recirculation duct 620 in a direction about perpendicular to the longitudinal x-x axis and exhausts 624 into the shroud annulus 337 in a direction about parallel to the longitudinal x-x axis.

In an embodiment, the duct structure 600 is substantially coaxially arranged about the longitudinal x-x axis and includes a substantially circular inlet mouth 630 of diameter d1 and an opposed substantially circular outlet mouth 632 of diameter d2. The inlet mouth receives an inlet flow 612 and the outlet mouth exhausts an outlet flow 624.

By virtue of the dividing wall 615 of the duct structure 600, the duct structure is divided to provide a supply lumen 631 that is isolated from a recirculation lumen 633. In the supply lumen, the direction of flow 640 is toward a sidewall outlet 613 and in the recirculation lumen the direction of flow 642 is from a sidewall inlet 623.

In the supply lumen 631 the flow cross-sectional area decreases from the inlet mouth 630 toward the sidewall outlet 614 such that the flow velocity is increased along this path. And, in the recirculation lumen 633 the flow cross-sectional area increases from the sidewall inlet 623 toward the outlet mouth 632 such that the flow velocity is decreased along this path.

Various embodiments provide a sidewall outlet 614 via perforations in the sidewall (as shown). And, various embodiments provide a sidewall inlet 623 via perforations in the sidewall (as shown). Other embodiments may utilize one or more nozzles integral with the sidewall or not integral with the sidewall rather than perforations.

The sidewall outlet 614 may be designed to provide a pressure drop across the outlet that tends to release gas that is in solution with the fluid 640. The recirculation lumen 633 may be designed to provide a pressure rise through the lumen that tends to dissolve gas in the fluid 642.

Figure 7:
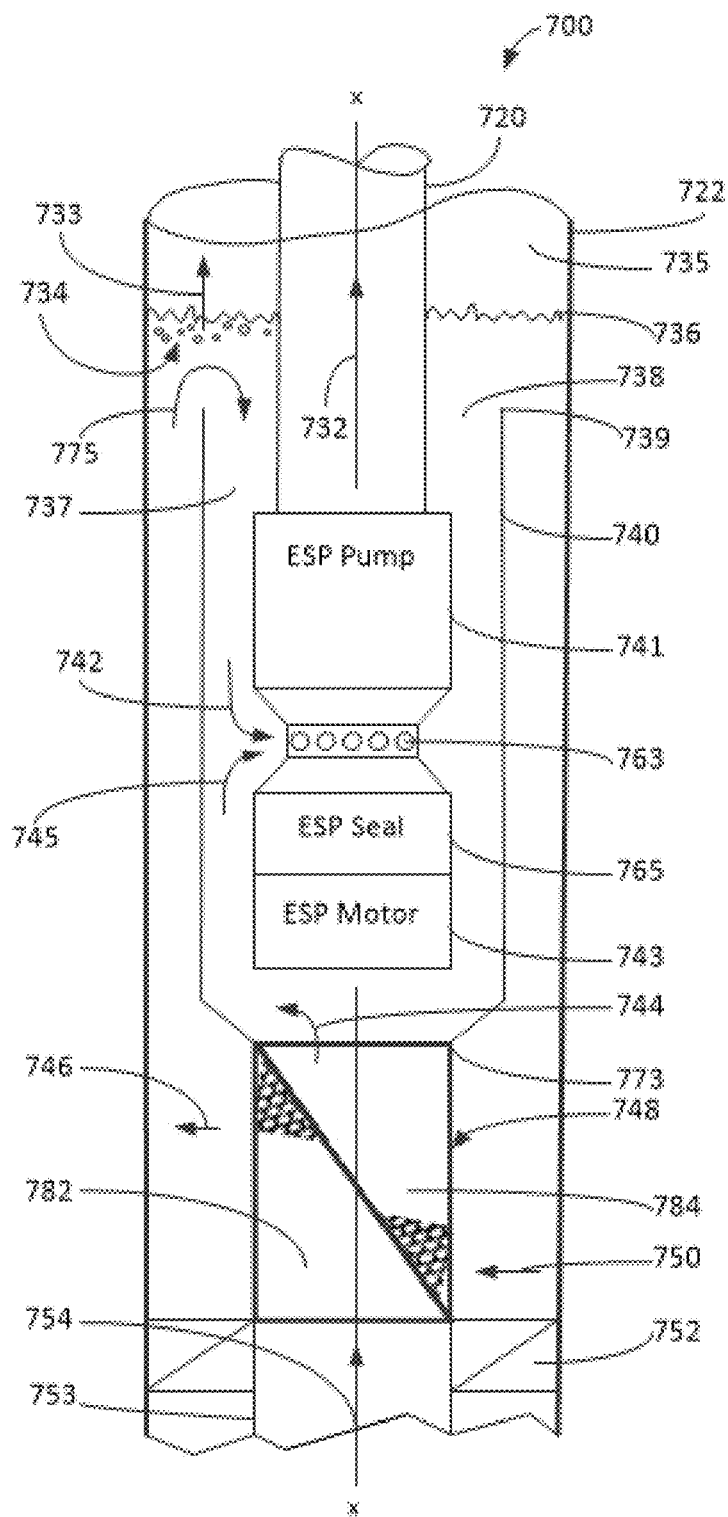
FIG. 7 shows an embodiment of the gas separator of FIG. 1 utilizing a biduct with a common dividing wall.

FIG. 7 shows a gas separator of the present invention installed in a downhole location 700. The gas separator is installed in a production string including a pump and production tubing arranged substantially about a longitudinal x-x axis.

A casing 722 encircles production tubing 720 that is fluidly coupled with a pump such as an electric submersible pump having an upper pump section 741, a pump seal 765, and a lower motor section 743. A gas separator includes a pump inlet shroud 740 and a duct structure 748 that fluidly couples a pump inlet 763 and a reservoir tube 753. The duct structure 748 is similar to the duct structure of FIG. 6.

The pump 741 is for receiving fluid from a fluid supply such as a hydrocarbon reservoir 102. As shown, the pump receives fluid 754 from the reservoir tube 753 and moves the fluid 732 through the production tubing 720 for recovery, for example at a surface located well head.

In various embodiments, an annular passageway(s) 735 is formed between the casing 722 and one or more of (i) the production tubing 720, (ii) pump inlet shroud 740, (iii) duct structure 748, and (iv) reservoir tubing 753. An annular packer or sealing ring 752 seals the annulus 735 below the duct structure 748 to enable recovery of the separated gas 733, for example at a surface located well head.

As seen, the pump inlet shroud 740 is a figure of revolution, for example, a can, about the pump 741. A lower end of the shroud 773 interconnects with the duct structure 748 and an upper end of the shroud 739 is spaced apart from the production tubing 720 such that a shroud annulus 737 and an annular shroud inlet 738 are formed. In various embodiments, the shroud annulus provides a sump for the pump 741.

During normal operation, a fluid level 736 in the annulus 735 pools over the pump 741, seal 765, and motor 743 such that pump operation transfers fluid from the annulus to the production tubing 720. Gas recoverable 733 from the casing annulus 735 may result from gas that comes out of solution to form gas bubbles 734 that collapse near the pool surface 736.

The shroud annulus 737 is charged with fluid when fluid from the reservoir tube 753 passes 754, 746 through a supply duct 782 of the duct structure 748 into the casing annulus 735 and then passes 775 from the casing annulus into the shroud annulus 737 to feed 742 the pump inlet 763.

The shroud annulus 737 is charged with fluid when fluid from the casing annulus 735 passes 750, 744 through a recirculation duct 784 of the duct structure 748 into the shroud annulus 737 to feed 745 the pump inlet 763.

The present invention has been disclosed in the form of exemplary embodiments. However, it should not be limited to these embodiments. Rather, the present invention should be limited only by the claims which follow where the terms of the claims are given the meaning a person of ordinary skill in the art would find them to have.

What is claimed is:

1. A gas separator assembly for use in a gas production system, the assembly comprising:
    a biduct for installation in a cased downhole production string that includes a pump taking suction from a hydrocarbon reservoir;
    the pump for installation between production tubing and the biduct;
    the biduct for installation between the pump and reservoir tubing, the biduct having a longitudinal axis;
    a pump inlet shroud forming an annular pump sump;
    a biduct supply duct for receiving flow from the reservoir tubing and for discharging reservoir flow to an annulus bounded by the casing; and,
    a biduct recirculation duct for receiving flow from the annulus bounded by the casing;
    a common dividing wall that is shared by the supply duct and the recirculation duct;
    a triangular cross-section of the supply duct and a triangular cross-section of the recirculation duct;
    wherein 1) the flow received by the supply duct is received in a direction parallel to the longitudinal axis and discharged in a direction perpendicular to the longitudinal axis, 2) the flow received by the recirculation duct is received in a direction about perpendicular to the longitudinal axis and discharged in a direction about parallel to the longitudinal axis, and 3) the pump sump is charged when (i) flow from the supply duct enters the pump shroud and (ii) flow from the recirculation duct enters the sump.

2. A gas separator assembly for use in a gas production system, the assembly comprising:
- a biduct for installation in a cased downhole production string that includes a pump for producing a fluid flow from a hydrocarbon reservoir;
- the pump for installation between production tubing and the biduct;
- the biduct for installation between the pump and reservoir tubing, the biduct coaxially arranged about a longitudinal axis;
- a biduct central dividing wall isolating a wedge shaped supply lumen from a wedge shaped recirculation lumen;
- the biduct including a circular inlet mouth and an opposed circular outlet mouth;
- in the supply lumen, a flow path cross-sectional area decreases from the inlet mouth toward a sidewall outlet; and,
- in the recirculation lumen, a flow path cross-sectional area increases from a sidewall inlet toward the outlet mouth.

3. The gas separator assembly of claim 2 wherein the sidewall outlet is provided via a perforated portion of a supply lumen sidewall.

4. The gas separator assembly of claim 2 wherein the sidewall inlet is provided via a perforated portion of a recirculation lumen sidewall.

5. A gas separator assembly for use in a downhole production string, the gas separator assembly comprising:
- a biduct and a shroud for encircling a pump, the biduct including a supply duct and a recirculation duct;
- the production string, biduct, pump and shroud sharing a common center line;
- within a well casing, the pump for producing liquid from a hydrocarbon reservoir;
- the pump for location between production tubing and the biduct;
- the biduct for location between a base of the pump shroud and reservoir tubing;
- the casing and the pump shroud forming an outer annulus therebetween;
- the pump shroud and the pump forming an inner annulus therebetween;
- wherein during operation the annuli are flooded with liquid such that the pump takes suction from a sump within the pump shroud, the inner annulus and sump being supplied with liquid i) that earlier entered the outer annulus via the supply duct and ii) from the recirculation duct; and,
- wherein during operation the supply duct provides a pressure drop sufficient to release gas that is in solution with the liquid passing therethrough.

* * * * *